May 3, 1960 L. W. SCHMIDT 2,935,137
SUGAR BEET HARVESTER FOR TRACTORS
Original Filed March 25, 1957 3 Sheets-Sheet 1
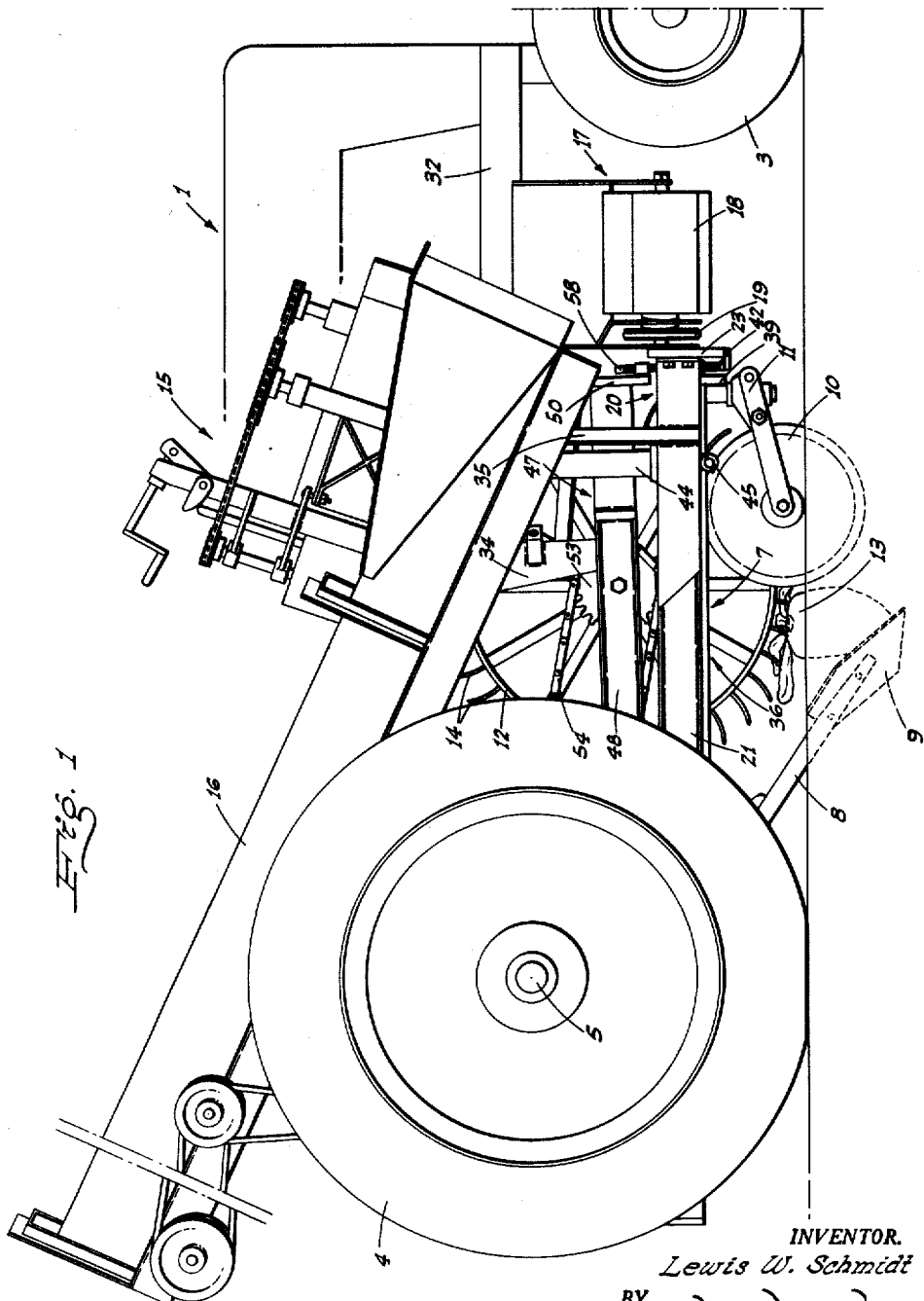
INVENTOR.
Lewis W. Schmidt
BY Webster & Webster
ATTYS.

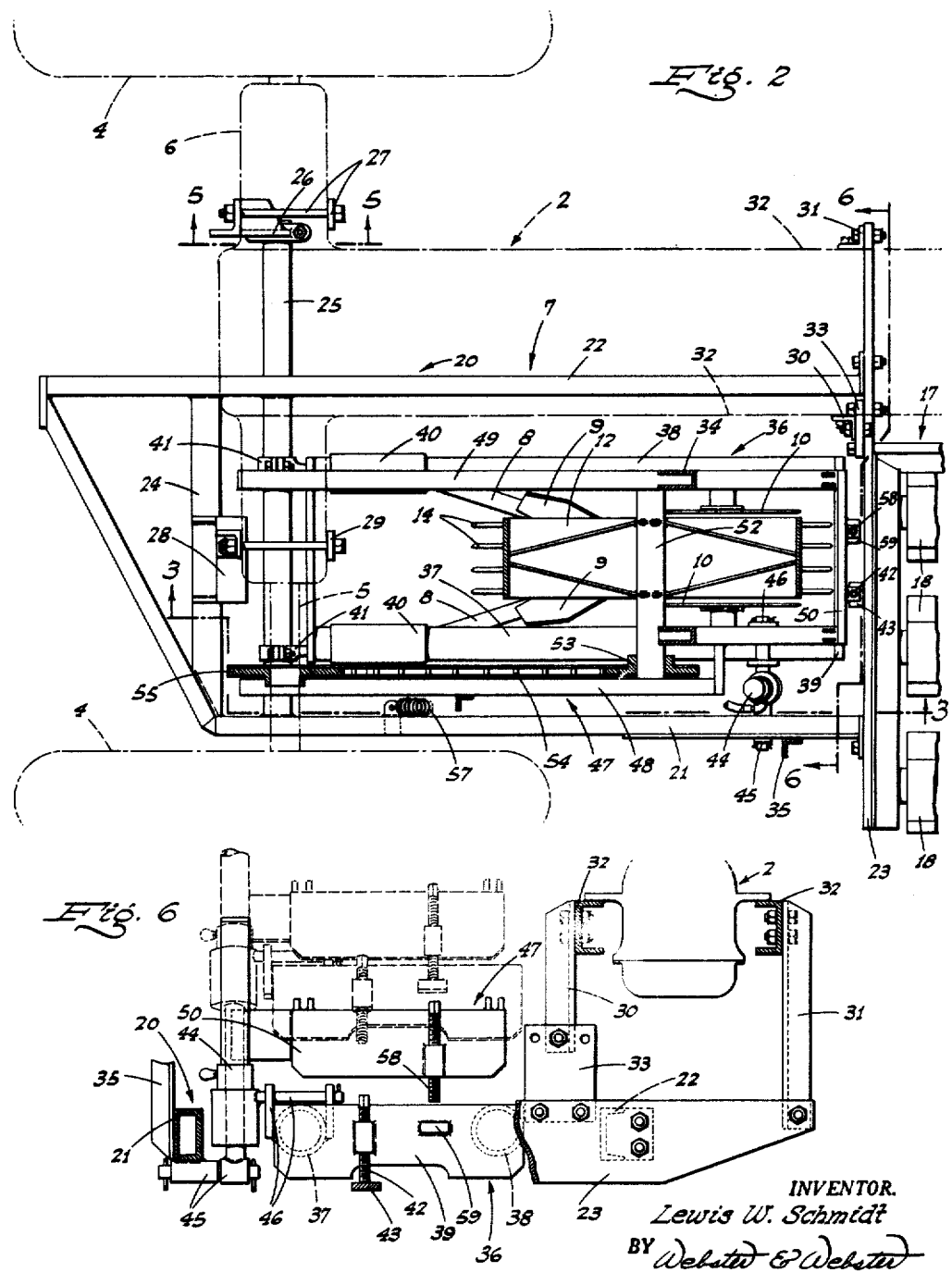

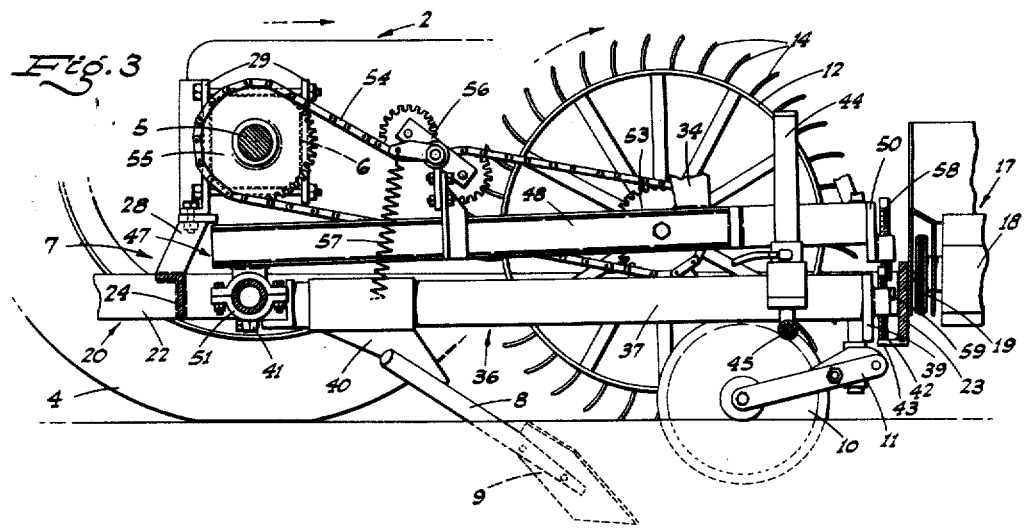

& nbsp;

2,935,137

SUGAR BEET HARVESTER FOR TRACTORS

Lewis Wallace Schmidt, Rio Vista, Calif., assignor of small interests to various assignees Continuation of application Serial No. 648,031, March 25, 1957. This application March 16, 1959, Serial No. 799,811

6 Claims. (Cl. 171—53)

The present invention relates to a tractor-mounted sugar beet harvester unit, and particularly constitutes an improvement over the type of harvester shown in United States Letters Patent No. 2,535,960, dated December 26, 1950; this application being a continuation of application Serial No. 648,031, filed March 25, 1957, now abandoned.

The major object of this invention is to provide a sugar beet harvester unit which is adapted to be mounted, as such, on—or removed from—a tractor of conventional design. By reason of such unitary arrangement the entire harvesting mechanism can be readily mounted and used on tractors of different manufacturers without altering the harvester structure, and with only minor change in—or positioning of—the attachment members.

To this end, it is the aim of the invention to provide for such a harvester unit a novel frame assembly; such assembly comprising a three-frame design which includes a first rigid main frame carrying attachment elements whereby such main frame may be mounted in rigid but detachable connection with the superstructure of a tractor; a second frame mounted on the first frame and carrying plow and coulter elements, such second frame being vertically adjustable with respect to the main frame for controlling the depth at which the plows and coulters may enter the ground adjacent the row of beets being harvested; and finally a third frame mounted on the main frame and carrying a spiked, beet pick-up wheel and beet topping mechanism, such third frame being floatably mounted with respect to the first main frame.

An additional object of the invention is to provide a novel frame assembly, as in the preceding paragraph, wherein the depth-control frame for the plows and the floating frame for the beet pick-up and topping mechanism are movable, between a lowered working position and a raised non-working or transport position, by means of a power device included in the unit and connected to said fixed frame.

A further object of the invention is to provide a tractor-mounted beet harvester which—by reason of its structure, including said novel frame assembly—can be readily and economically manufactured, in substantially identical form, for use on different tractors; can be conveniently mounted on a selected tractor; and as so mounted functions in a positive and effective manner for the intended purpose.

It is also an object of the invention to provide a practical, reliable, and durable tractor-mounted sugar beet harvester.

These objects are accomplished by means of such structure and relative arrangement of parts as will fully appear by a perusal of the following specification and claims.

In the drawings:

Fig. 1 is a side elevation of the improved sugar beet harvester as it appears when mounted on a wheel-type tractor.

Fig. 2 is a sectional plan view taken adjacent but from above the unitary frame assembly, and primarily showing the same.

Fig. 3 is a longitudinal sectional elevation taken on line 3—3 of Fig. 2, with the depth-control frame and floating frame in lowered or working position.

Fig. 4 is a similar view, but shows the depth-control frame and floating frame in raised, non-working or transport position.

Fig. 5 is a fragmentary transverse section on line 5—5 of Fig. 2.

Fig. 6 is a fragmentary transverse sectional elevation on line 6—6 of Fig. 2; the depth-control frame and the floating frame being shown in lowered position, as in Fig. 3, in full lines, and in raised position, as in Fig. 4, in broken lines.

Referring now more particularly to the drawings, and to the characters of reference marked thereon, the improved sugar beet harvester is here shown as mounted in connection with a wheel-type tractor, indicated generally at 1, which tractor includes a longitudinal body 2 supported by front wheels 3 and relatively widely spaced rear wheels 4. The rear wheels 4 are carried on the outer ends of axles 5 which project from housings 6 extending laterally from the rear end of the tractor body 2.

The beet harvester unit is adapted to be mounted lengthwise of the tractor between the body 2 and one of the rear wheels 4, and, in the main, to project forwardly from the related axle and axle housing 6; such harvester unit including the frame assembly of three-frame design which constitutes the essential feature of the invention and which is indicated generally at 7, and which will now be described in detail.

A first rigid, preferably substantially rectangular frame, hereinafter referred to as the main frame, and which is indicated generally at 20, constitutes the support for all the operating elements of the harvester unit. As described later, this frame 20 is provided with means for attaching it to certain parts of the superstructure of the tractor 1. Preferably, this attachment is such that when mounted on the tractor the frame 20 will lie in a plane below the tractor body 2 and essentially between one of the wheels 4 and the body of the tractor and forwardly of the related axle of the wheel. This rigid frame assembly 20 includes side beams 21 and 22, a front cross beam 23 and a rear cross beam 24.

A cross shaft 25 is fixed to and extends between the side beams 21 and 22 and projects to a free end termination at a distance beyond the latter; such shaft 25 lying adjacent and parallel to the rear cross beam 24. At its outer free end, the shaft 25 is fitted with an upstanding bracket 26 carrying a clamp 27. The position of the free end of the shaft 25 and bracket-clamp arrangement is such that in mounting the harvester unit on the tractor, the bracket 26 may be rigidly attached to the axle housing 6 most remote from frame assembly 7, as shown clearly in Figs. 2 and 5.

A bracket 28, similar to bracket 26, upstands from the rear cross beam 24 centrally of the ends of the latter and carries a clamp 29 in such position that in mounting the harvester unit on a tractor, said clamp 29 may be rigidly attached to the near axle housing 6 as shown best in Figs. 2 and 3.

The front cross beam 23 of the rigid frame 20 extends laterally of such frame 20 in substantial parallelism with the extension of shaft 25 and when the unit is in the position in which it is to be attached to the tractor, such extended portion of the beam 23 underlies the body 2 of said tractor. At its free outer end, the extended cross beam 23 is provided with upstanding posts 30 and 31 arranged to be bolted to side beams 32 forming part of the tractor body. The post 30 is made laterally adjustable relative to the frame 20 by a connector plate 33 interposed between it and the extended portion of cross beam 23 (see Fig. 6) so that the span between posts 30 and 31 can be adjusted to mount the frame 20 on tractors of different frame sizes.

It will be seen that through the instrumentality of the bracket 26 and clamp 27, the bracket 28 and clamp 29, and the posts 30 and 31, the rigid main frame 20—which, as will be pointed out later, carries all of the operating parts of the harvester unit—may be effectively attached to and be relatively rigid with the superstructure of the tractor 1. By the simple expedient of modifying the clamps 27 and 29 and altering the spacing of the posts 30 and 31, such frame 20 can be readily adapted for attachment to many different types of tractors.

There will now be described in detail the beet harvesting instrumentalities which are mounted on and carried by the rigid main frame 20.

A second frame 36—hereinafter referred to as the depth control frame—is vertically swingably attached adjacent its rear end to the fixed cross shaft 25 by split collars 41, and such frame projects forwardly from the shaft 25 and may swing up and down between the side beams 21 and 22 of the main frame 20 when the latter is fixedly attached to the tractor superstructure in the manner described above.

The depth control frame 36 includes side beams 37 and 38 connected at their forward ends by a front cross plate 39. Standards 8, carrying subsoil plows 9, are secured by attachment devices 40 to the side beams 37 and 38. Similarly, coulters 10 are attached by mounting elements 11 to such side beams 37 and 38 forwardly of the subsoil plows 9. When the parts are in operating position—as shown in Fig. 1—and the tractor carrying the harvester unit is driven forwardly, the coulters 10 cut the foliage on opposite sides of the beets 13, and the subsoil plows loosen the beets ready to be impaled and lifted from the ground and carried to a topping unit to be described.

The desired lowered position of the depth control frame 36 carrying the plows and coulters may be predetermined by the adjustment of a set screw 42 on the front cross plate 39, which set screw is adapted to abut at its lower end against a stop 43 which projects rearwardly from the lower edge of the front cross beam 23 of the main frame 20.

The lowering and raising of the depth control frame 36 may be effected through the operation of a fluid pressure operated cylinder 44 pivotally mounted by instrumentalities 45 and 46 between the side beam 21 of the rigid main frame 20 and the side beam 37 of the depth control frame 36. This connection is best seen in Figs. 2 and 6. When the harvester unit is in operation, the piston of the power cylinder 44 is contracted and inactive and the set screw 42 is in engagement with the stop 43 on the then fixed rigid main frame 20. See Figs. 3 and 6. However, when the harvester is not in operation, the cylinder 44 may be energized to extend its piston rod against the inertia of the fixed frame 20 which causes the depth control frame 36 to be swung upwardly to raised or transport position to lift the plows and coulters clear of the ground. See Fig. 4 and the dotted lines in Fig. 6.

A third frame—indicated generally at 47, and hereinafter referred to as the floating frame—is provided to carry a spiked, beet pick-up wheel and beet topping instrumentalities hereinafter described.

This third frame 47 includes side beams 48 and 49 and a front cross plate 50. The side beam 48 is provided, adjacent its front end, with an inward offset to accommodate the upstanding power cylinder 44 in clearance relation. This is best seen in Fig. 2.

At their rear ends, the side beams 48 and 49 of the floating frame 47 are provided with split collars 51 rotatably mounted about the fixed cross shaft 25 and which collars depend a short distance downwardly from the ends of the side beams 48 and 49 in order to hold the floating frame 47 a short distance above the depth control frame 36, whereby the floating frame may float upwardly and downwardly relative to the depth control frame.

A spiked, beet pick-up wheel 12 is disposed within the confines of the frame work of the floating frame 47. This wheel 12 is mounted on a cross shaft 52 which is journaled in the forward portion of the floating frame 47; the wheel 12 depending between the side beams 21 and 22 of fixed frame 20 for engagement with the ground so that when the harvester unit is in operation the spikes 14 on the wheel 12 may engage and lift the beets 13 as the spiked wheel is rotated through the instrumentality of a sprocket wheel 53 fixed on the shaft 52 and driven by an endless chain 54 which engages a drive sprocket 55 mounted on the tractor axle 5.

A double sprocket type chain tightener 56 is mounted on the floating frame 47 and engages the upper run of the chain 54. The necessary tightening force is imparted to the tightener 56 by a heavy duty tension spring 57 connected between an arm of the tightener and an anchor point on the side beam 21 of the main frame 20. This spring-controlled tightener arrangement functions to maintain the chain 54 substantially taut, yet the yieldable spring 57 permits the floating frame carrying the spiked pick-up wheel 12 to float up and down as the wheel rides along the beet row where the ground may be undulating.

The spiked, beet pick-up wheel 12 turns in an upward direction at the rear so that beets 13, impaled on the spikes 14, will be carried to a conventional beet topping unit indicated generally at 15 and supported on the side beams 48 and 49 of the floating frame 47 so that the topping unit floats with the floating frame; a portion of the supporting structure being shown at 34. See Figs. 1 and 2. When the tops are severed from the beets, the latter drop into the lower end of a longitudinal elevator conveyor 16 supported from the main frame 20 by elements 35, which elevator conveyor extends at an upward and rearward incline to a rear high point of discharge into a trailing cart (not shown).

The relation of the floating frame 47 to the depth control frame 36 is such that during the operation of the harvester unit the frame 47 floats freely relative to the frame 36. However, when the depth control frame is swung upwardly from working position (as shown in Figs. 1 and 3) to transport position (as shown in Fig. 4) through the operation of the power cylinder 44, a stop plate 59 on the front cross plate 39 of frame 36 abuts an adjustable set screw 58 carried on the front cross plate 50 of frame 47. Thus, frame 47 (and the beet pick-up and topping parts carried thereby) is thereafter raised to inoperative or transport position with the continued raising of frame 36; the whole assembly of operating parts then turning about shaft 25 on main frame 20 as an axis, all while the main frame 20 remains in its fixed position on the tractor superstructure. As the floating frame 47 is thus swung upwardly, the spring 57—as anchored to the fixed main frame 20—functions to take up the slack in the endless chain 54.

The beet foliage and crowns which remain on the spiked pick-up wheel 12 after the beets are severed by the topping unit 15 are stripped by suitable means (not shown) and fall onto a transverse tumbling conveyor 17 mounted on and supported by the front cross beam 23 of the main frame 20.

When the harvester unit of the three-frame design, as above described, is attached to a tractor in the manner described, it will be seen that the main frame 20 remains fixed and rigid with respect to the tractor body and moves therewith, and carries all the operating instrumentalities which function to dig, lift and top the beets and dispose of the topped beets and the trimmings and debris resulting from such topping operation. Thus, the entire operative harvester, as a unit, may be attached to—or detached from—a tractor, avoiding the necessity of changing the poistion of any such parts or separately attaching any of them to—or in connection with—the tractor structure, as was necessary in the organization of parts disclosed in Patent No. 2,535,960 referred to in the preamble to this specification. Such advance in the art results in economy of manufacture and convenience of installation of the unit on the tractor, and the unit may be readily attached to the tractors of different manufacturers.

A further advantage in the organization of the described unit is the fact that the elevator conveyor 16 and the tumbling conveyor 17 are both carried on the rigid main frame 20 and hence do not move with either the depth control frame 36 or the floating frame 47 and hence do not in any way interfere with the proper functioning of such frame.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. A beet harvester unit comprising a first unitary rigid main frame, means on said frame for attaching the same on and in fixed rigid position relative to the superstructure of a tractor, a second frame mounted on said first frame and vertically adjustable relative thereto, plow and coulter elements carried on the second frame, a third frame mounted on said main frame and adapted for floating up and down movement relative thereto, beet pick-up and topping instrumentalities carried on said third frame, and means to lower and raise the second and third frames relative to the main frame.

2. A beet harvester unit, as in claim 1, in which the means for attaching the main frame to the superstructure of a tractor comprises rigid elements secured to and projecting outwardly from edges of the main frame, and attachment elements on said rigid elements adjacent the outer ends thereof.

3. A harvester unit, as in claim 1, including conveyor elements fixed on said main frame and adapted to convey material from the beet topping instrumentalities.

4. A beet harvester unit comprising a first rigid substantially rectangular unitary main frame, means on said frame for attaching the same on and in fixed rigid position relative to the superstructure of a tractor, a cross shaft mounted on the main frame adjacent one end thereof, a second substantially rectangular frame journaled at one end on said shaft and adapted for up and down swinging movement between the sides of said main frame, means between the two frames for limiting the downward movement of the second frame relative to the main frame, lift means interposed between the main frame and the second frame and operative to raise the second frame relative to the main frame, a third substantially rectangular frame journaled on said shaft and normally lying in a plane above and substantially parallel to the second frame, and a driven spiked, beet pick-up wheel journaled in the third frame and extending downwardly between the sides of the second frame and adapted to floatingly ride over and in engagement with a row of beets.

5. A beet harvester unit, as in claim 4, including abutment means on the second and third frames adapted to engage with each other when the second frame is lifted whereby both frames may then be simultaneously swung upward about their pivotal points on the shaft.

6. A beet harvester unit, as in claim 4, including beet topping means carried on the second frame, and conveyors mounted on the main frame and effective to receive beets and beet toppings from the beet topping means and to convey such material to a point remote from the unit.

References Cited in the file of this patent

UNITED STATES PATENTS

| | | |
|---|---|---|
| 2,535,960 | Schmidt | Dec. 26, 1950 |
| 2,582,945 | Bingham et al. | Jan. 22, 1952 |
| 2,637,155 | Schmidt et al. | May 5, 1953 |